Jan. 26, 1954

H. LANG 2,667,152

FUEL INJECTION AND DISTRIBUTING APPARATUS
FOR INTERNAL-COMBUSTION ENGINES

Filed Aug. 31, 1951

INVENTOR
Heinrich Lang

BY
ATTORNEY

H. LANG 2,667,152

FUEL INJECTION AND DISTRIBUTING APPARATUS
FOR INTERNAL-COMBUSTION ENGINES

Filed Aug. 31, 1951

*INVENTOR.*
Heinrich Lang
BY

ATTORNEY

Jan. 26, 1954

H. LANG

2,667,152

FUEL INJECTION AND DISTRIBUTING APPARATUS
FOR INTERNAL-COMBUSTION ENGINES

Filed Aug. 31, 1951

INVENTOR
Heinrich Lang
BY
ATTORNEY

Patented Jan. 26, 1954

2,667,152

UNITED STATES PATENT OFFICE 2,667,152

FUEL INJECTION AND DISTRIBUTING APPARATUS FOR INTERNAL-COMBUSTION ENGINES

Heinrich Lang, Munich, Germany

Application August 31, 1951, Serial No. 244,605

Claims priority, application Switzerland
September 6, 1950

13 Claims. (Cl. 123—138)

My invention relates to a fuel injection and distributing apparatus for internal combustion engines and more particularly to apparatuses of such type for injecting liquid fuel in controllable equal quantities into a plurality of engine cylinders.

The main object of my invention is to devise an apparatus of the type indicated above which will exactly maintain and control the proper time for the injection of the fuel and the quantity of the fuel to be injected into the engine cylinders in accordance with the output of the engine and independently of its speed.

Another object of my invention is to limit the number of movable parts in such apparatus and to simplify its construction, maintenance and work without impairment to its reliability.

The said and other objects of my invention will be more fully understood from the following specification when taken with the accompanying drawing in which several embodiments are illustrated. In the drawing.

The same reference characters indicate the same parts in all figures of the drawing.

Figures 1, 3, 4:
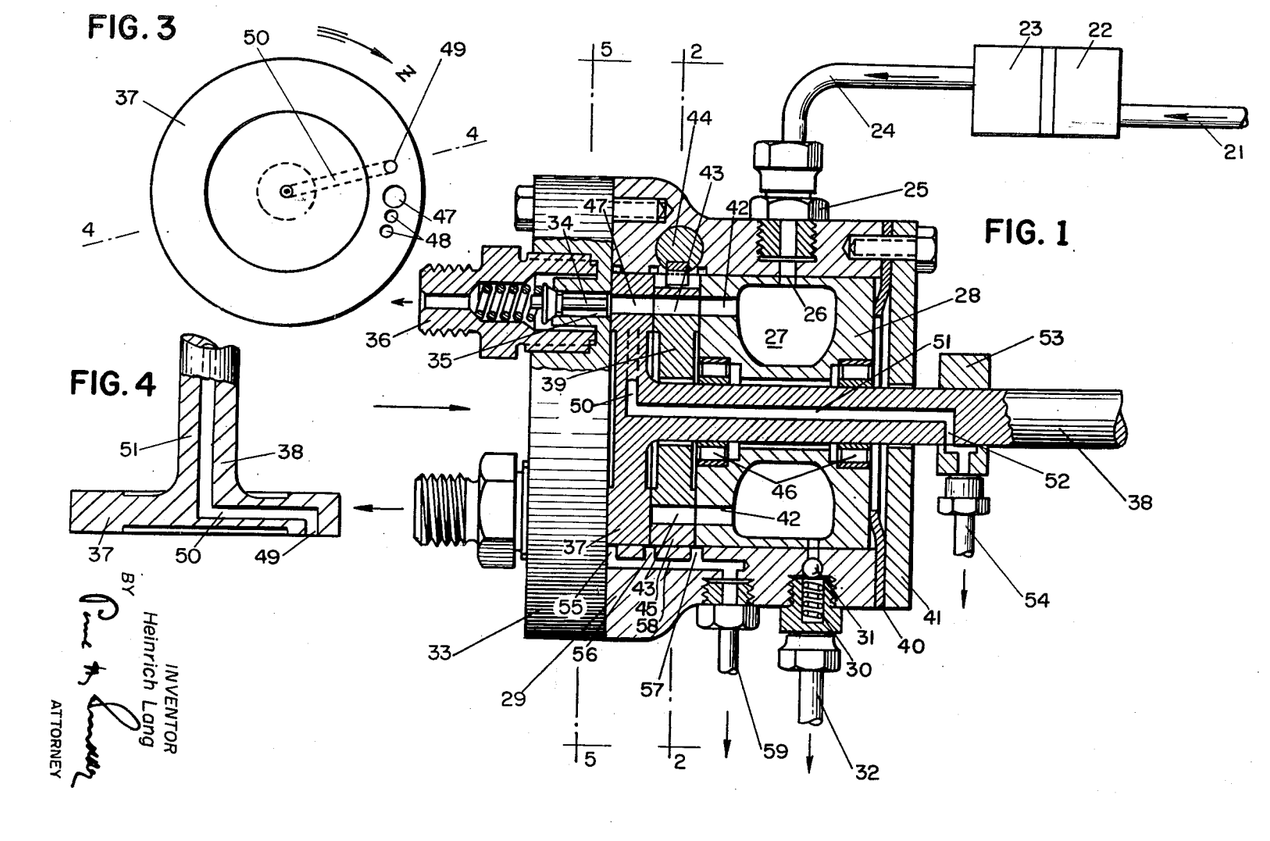
Fig. 1 shows a longitudinal sectional view of one embodiment of my invention.
Figs. 3 and 4 show a certain part of my apparatus namely the rotatable fuel distributor in front view as seen in the direction of arrow 3 in Fig. 1 and in longitudinal sectional view along line 4—4 in Fig. 3, respectively.

As illustrated in Fig. 1 a suction pump 22 draws liquid fuel through a pipe 21 over a customary fuel filter from a storage tank or tanks not shown in the drawing and delivers the fuel to the high pressure pump 23 which feeds the fuel through pipe 24, pipe joint 25 and passage 26 into the fuel pressure chamber 27 of an accumulator 28. This accumulator is in the shown embodiment of cylindrical shape and is fitted into the cylindrical bore of a casing 29. In the fuel pressure chamber 27 the fuel is accumulated under nearly constant pressure which has to be at least as high as the pressure required for injecting the fuel into the engine cylinders. The fuel pressure in the pressure chamber 27 may be controlled by adjusting the spring 30 of the control valve 31 and any surplus fuel passing through said valve 31 is fed back into the storage tank or tanks through the return pipe 32.

Figure 5:
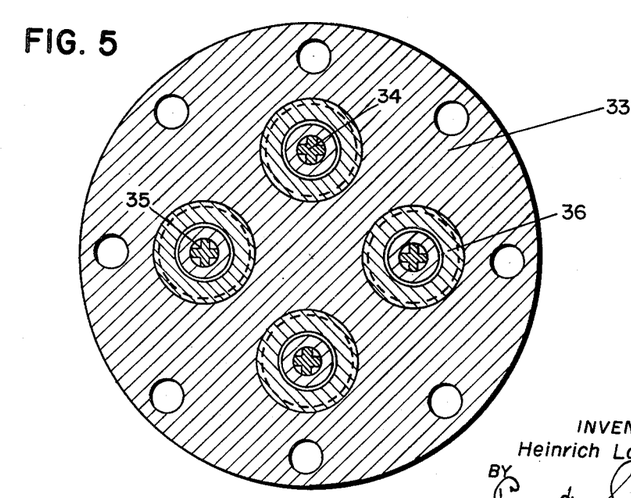
Fig. 5 shows a cross section along line 5—5 in Fig. 1.
Figure 11:
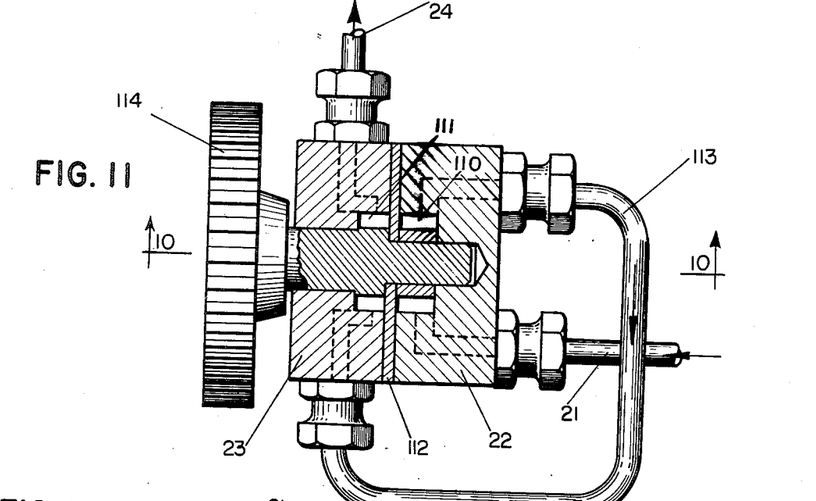
Figures 12, 13, 14:
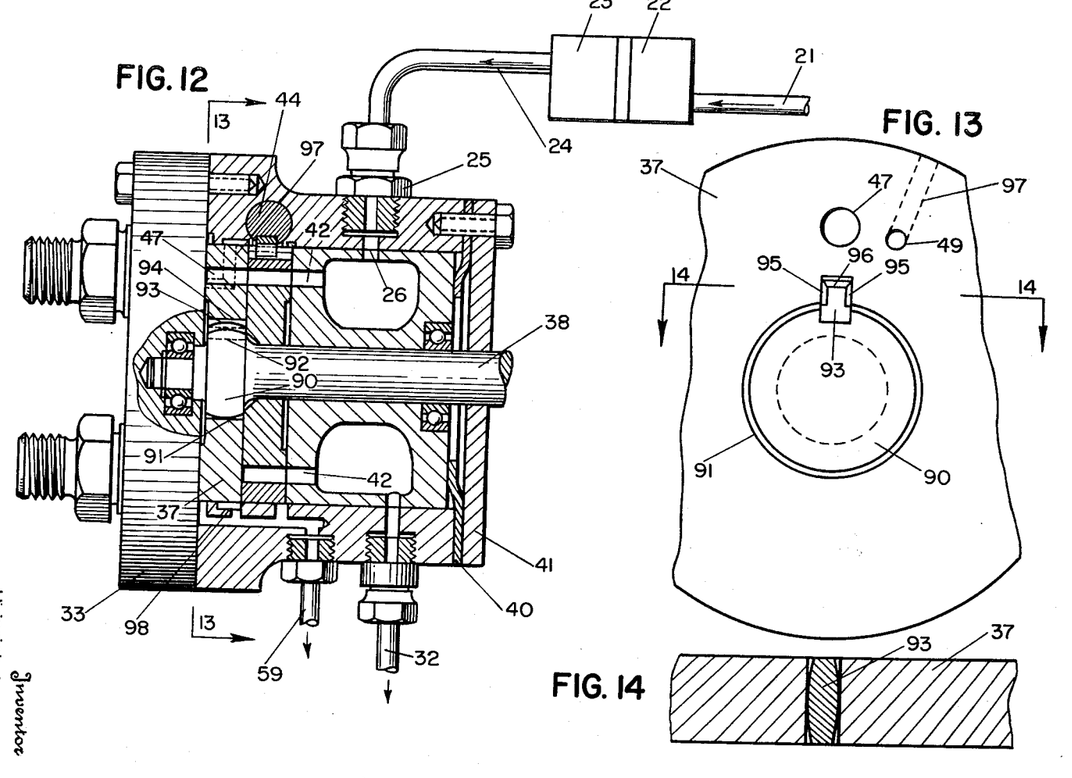
Fig. 12 shows a longitudinal sectional view of a further modified embodiment of my invention and Figs. 13 and 14 show enlarged partial sectional view along line 13—13 in Fig. 12 and along line 14—14 in Fig. 13 respectively.

The casing 29 of the injection device is closed on one side by the head plate 33 screwed thereto. Said head plate or cover 33 contains spring loaded check valves 34 corresponding in number to the number of cylinders in the engine, for example four in the shown embodiment. The said check valves 34 are arranged concentrically in equally spaced bore holes 35 as illustrated in Fig. 5 and each of these check valves 34 is connected by a pipe joint 36 to an injector pipe leading to one of the engine cylinders. Within the bore of the casing 29 and contacting the inner face of the head plate 33 is the rotating distributor disc 37 connected to its driving shaft 38 either solidly as shown in Fig. 1, or flexibly as illustrated in Figs. 11, 12, and 13 and later described. Said shaft 38 is driven in timed relation to the engine either directly by the main engine shaft or by means of an intermediate shaft. Between said distributor disc 37 and the front face of the fuel accumulator 28 is the rotatable throttle disc 39 the construction and function of which will be later described.

The said fuel accumulator 28, the distributor disc 36 and the throttle disc 38 are fitted into the cylindrical bore of the stationary casing 29 to permit a displacement in axial direction therein and they are held in close assembly and are pressed against each other and the head plate 33 by means of the cup spring 40 which is retained by the ring plate 41 screwed to the casing 29.

Figure 2:
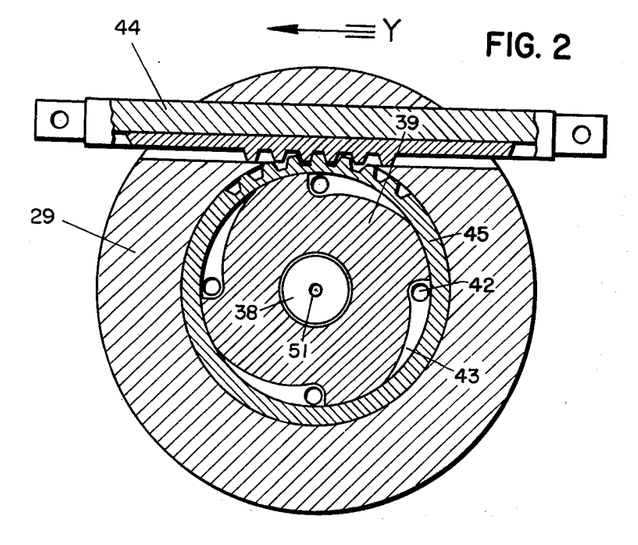
Fig. 2 a cross section along line 2—2 in Fig. 1.

The fuel accumulator 28 is provided in its wall facing the throttle disc 39 with a plurality of outlet ducts 42 corresponding in number to the number of bore holes 35 in the head plate 33 and therefore to the number of injection nozzles to be served with fuel. Each of these outlet ducts 42 leading into the fuel pressure chamber 27 is in line with one of boreholes 35 in the cover 33 receiving the check valves 34 for the injector pipe lines. The outlet ducts 42 are controlled by the adjustable throttle disc 39 which is shown in Fig. 2 in an enlarged cross section. This disc 39 is surrounded by a shrunk-on collar 45 and is provided with slots 43 of decreasing width opposite to each outlet duct 42 so that by rotatingly adjusting the throttle disc 39 the degree of overlapping of each duct 42 and the corresponding slot 43 may be changed and the quantity of the fuel passing from the fuel pressure chamber 27 through the outlet ducts 42 controlled. The partial rotation of the throttle disc 39 may be effected by means of a rack 44 which meshes with a spur gear segment arranged on said shrunk-on collar 45. In the position of the throttle disc 39 shown in Fig. 2, the outlet ducts 42 are unthrottled so that the maximum quantity of fuel flowing through said ducts 42 from the pressure chamber 27 may pass therethrough. If the rack 44 is moved to the left in direction of the arrow Y shown in Fig. 2 the throttle disc 39 will be rotated anti-clockwise and the slot orifices 43 will progressively close the ducts 42 so that the fuel quantity passing therethrough will decrease without necessitating any change of the injection period.

The distribution and apportioning of the fuel flowing from the fuel pressure chamber 27 through the outlet ducts 42 and the slots 43 of the throttle disc 39 is effected by the distributor disc 37 which in the embodiment shown in Figs. 1 through 5 is integral with its shaft 38 and rotates in timed relation to the engine. However, said distributor disc 37 and its driving shaft 38 may be connected flexibly as illustrated in Figs. 11, 12 and 13 and later described. As shown in Fig. 1 the shaft 38 passes freely through a central opening of the throttle disc 39 and of the fuel accumulator 28 and is supported by roller bearings 46 mounted in the central bore hole of said accumulator. The rotating distributor disc 37 is provided with an apportioning connecting duct 47 which registers consecutively with the slot orifices 43 of the throttle disc 39 and the valve bores 35 in the head plate 33. In this way the rotating distributor disc 37 subdivides and distributes proportionally the fuel flowing from the pressure chamber 27 into individual charges for the different engine cylinders, the size of these charges being determined by the adjusted position of the turnable throttle disc 39.

The shaft 38 driving the distributor disc 37 is driven as already stated above either directly or indirectly by the main shaft of the engine in timed relation thereto. The ratio of the speed of said shaft 38 to that of the main shaft of the engine will be 1:1 in two cycle engines and 1:2 in four cycle engines.

The distributor disc 37 contains in the direction of its rotation (arrow Z in Fig. 3) ahead of the apportioning duct 47 one or more auxiliary ducts 48 which during the rotation of said disc register with each of the outlet ducts 42 of the accumulator 28 and with each of the bore holes 35 for the check valves 34 axially aligned therewith. These auxiliary ducts 48 serve to effect, if desired, a pre-injection of fuel into the engine cylinders.

To avoid accumulation of pressure fuel in the valve bores 35 below the check valves 34 and to insure a quick closing of said valves after passage of a fuel charge therethrough the distributor disc 37 is provided with a draining channel 49 which during the rotation of the distributor disc 37 passes along each of said valve bores 35. Said channel 49 is connected by a radially extending channel 50 to a channel 51 running axially through the shaft 38 beyond the ring plate 41 where said axial channel 51 passes into a radial outlet channel 52 which empties into a stationary collecting ring 53. From this ring the drained fuel is fed back into the storage tank or tanks through the return pipe 54.

To salvage fuel leaking between the contacting slide surfaces of the accumulator 28, the throttle disc 39, the distributor disc 37 and the inner face of the cover 33, respectively, annual collecting grooves 55, 56 and 57 are arranged in the casing 29 from where the leaking fuel is returned through the outlet channel 58 connecting said grooves and the adjoining pipe 59 to the storage tank or tanks.

The accumulator 28 may have any desired shape provided the cooperation of its slide face containing the fuel outlet ducts 42 with the opposing slide face of the throttle disc 39 is guaranteed. Said accumulator 28 is preferably constructed as an undivided hollow metal body though it may be composed of two or more parts fitted together. The control of the fuel pressure in the fuel pressure chamber 27 may be accomplished in addition to or in substitution of the control valve 31 mentioned above by a control valve arranged directly in the high pressure pump 23 which valve discharges surplus fuel into the feeder pump 22 or its suction pipe 21. Pressure fluctuations in the fuel pressure chamber 27 may also be avoided or held to a minimum by providing a pressure compensating chamber connected to said chamber 27. Said compensating chamber preferably has a larger capacity than the pressure chamber 27 and is arranged outside of the casing 29. This arrangement, however, is not shown in the drawing.

Figure 6:
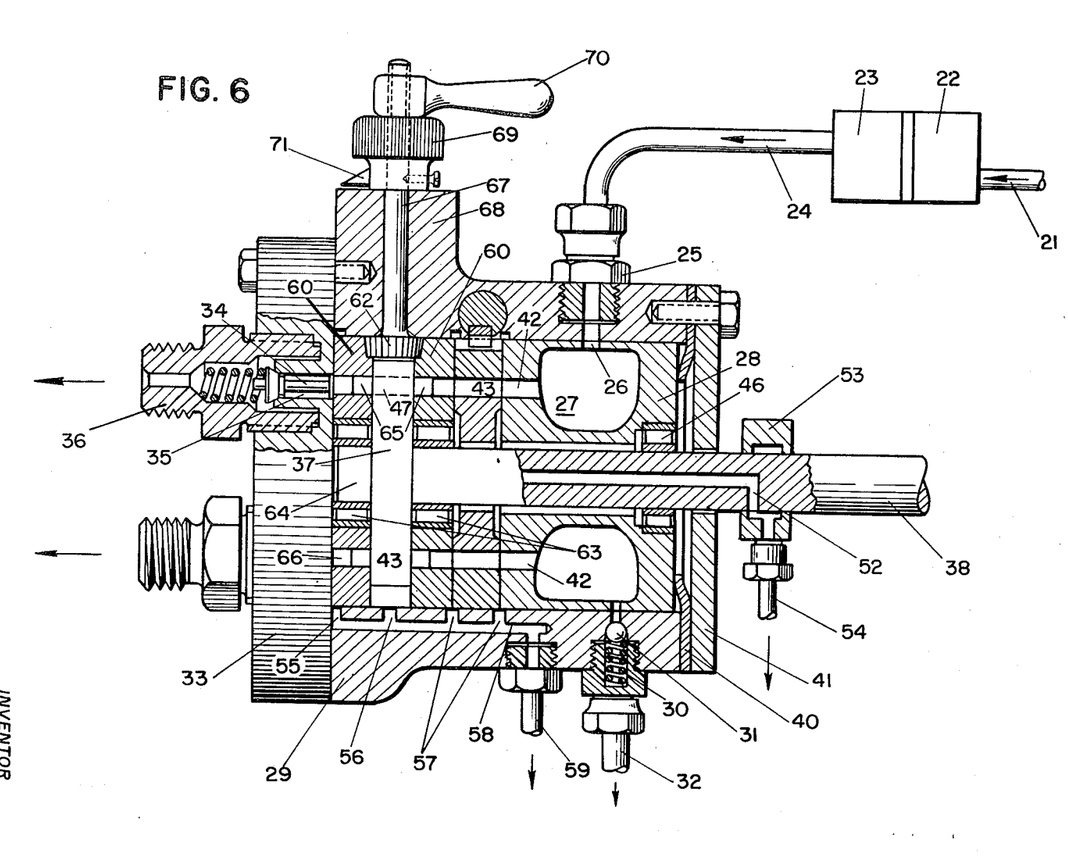
Fig. 6 shows a longitudinal sectional view of another embodiment of my invention.
Figure 8:
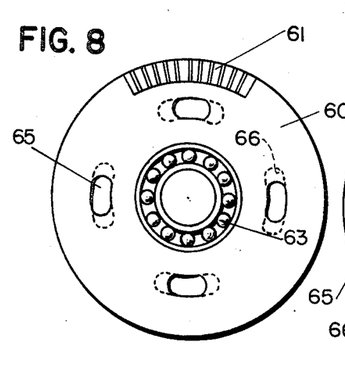
Figure 9:
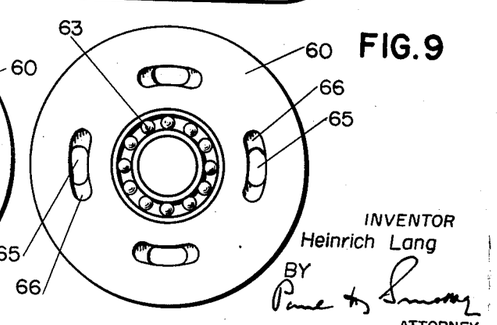

The embodiment of the fuel injection device shown in longitudinal section in Fig. 6 which is essentially composed of the same parts as the device shown in Fig. 1 comprises in addition thereto means for varying the injection period angle. Said device includes one adjusting disc 60 on each side of the distributor disc 37. Each of said discs 60, as shown in Figs. 8 and 9, is provided on its side facing the distributor disc 37 with a bevel gear segment 61 which cooperates with a bevel gear 62 and each of said discs 60 is supported by a roller bearing 63 mounted on the shaft 38 and on the axial extension 64 of the distributor disc 37, respectively. The said discs 60 contain on the same side provided with said bevel gear segment 61 equally long and equally spaced arc shaped slots 65, the length of which corresponds to the largest injection period angle desired, and on the side opposite to the side containing the bevel gear segment 61 these adjusting discs 60 are provided with curved grooves 66 into which said slots 65 lead. These grooves 66 have a depth of about half the thickness of the discs 60 and a length corresponding to the maximum variation of the injection start angle of the engine. The adjusting discs 60 are turned in opposite directions by the bevel gear 62 mounted upon the shaft 67 which rests rotatably in the shoulder 68 of the casing 29. A profiled knob 69 serves to rotate the shaft 67 with the bevel gear 62 by hand and a lever nut 70 on the shaft 67 serves to arrest the desired position thereof.

An index 71 on the profiled knob 69 and a graduated scale on the top of the shoulder 68 will permit to take readings on the injection period angle set by rotation of said knob 69.

The said adjusting discs 60 cooperate with the distributor disc 37 as follows:

Suppose that the shaft 38 and the control disc 37 rotate in the direction of arrow Z in Fig. 3. If the bevel gear 62 is turned by means of the knob 69 and shaft 67 in anti-clockwise direction then the left disc 60 contacting the head plate 33 is turned in the direction of rotation of the control disc 37 and the other i. e. the right disc 60 opposite thereto. Therefore the overlapping between the duct 47 in the control disc 37 and the slot 65 in the right disc 60 will be advanced while the left disc 60 still blocks the flow of fuel from the pressure chamber 27 to the valve 34 and the adjoining injector pipe. Only after a further rotation of said disc 60 will the duct 47 in the distributor disc 37 also overlap the slot 65 of the left disc 60 thus freeing the way for the flow of fuel from the pressure chamber 27 to the valve 34 and the adjoining injector pipe. The duct 47 in the rotating distributor disc 37 comes out of cooperation with the slot 65 of the right disc 60 before the said duct 47 ceases to cooperate with the slot 65 in the left disc 60 so that the flow of fuel is interrupted earlier. As described before a rotation of the bevel gear 62 in anti-clockwise direction will result in a decrease of the angle of the fuel injection period that is in a shortening of the injection period as such. It is obvious that the just described adjustment will result in a retardation of the start of the fuel injection period.

Figures 6A, 7:
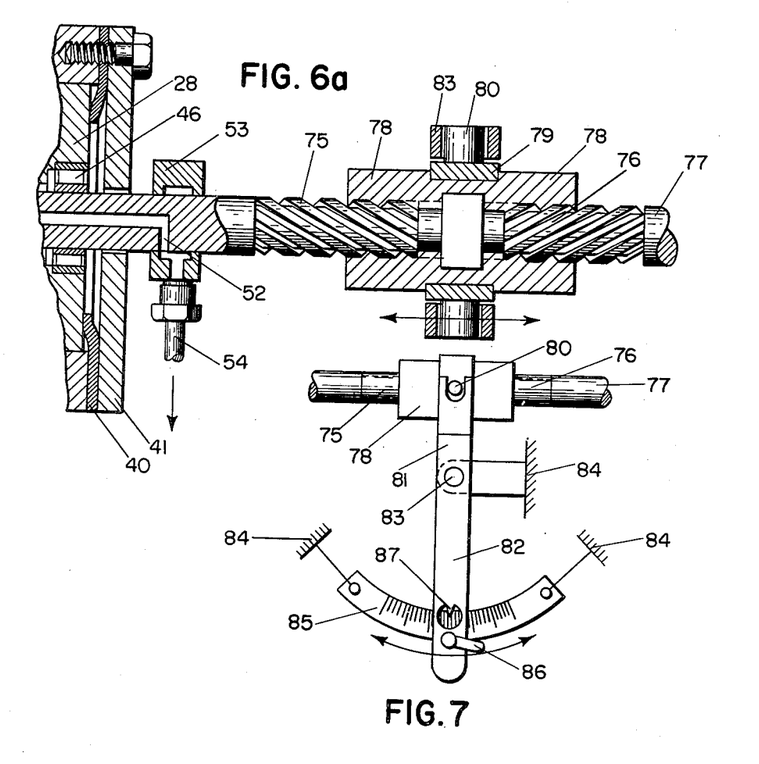
Fig. 6a shows a longitudinal sectional view through a device for adjusting the beginning of the injection period and intended for use in combination with the embodiment illustrated in Fig. 6.
Fig. 7 shows a top view in smaller scale of said adjusting device illustrated in Fig. 6a, Figs. 8 and 9 show the two side views of a certain part of the embodiment shown in Fig. 6 and more particularly referred to in the following specification.
Figure 15:
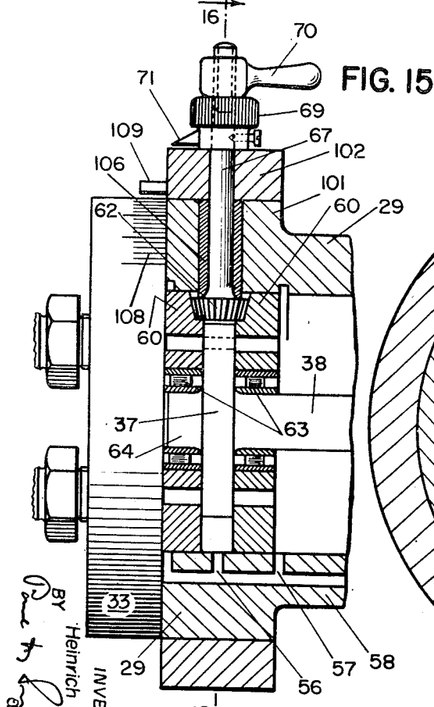
Fig. 15 shows a partial longitudinal sectional view of still another modified embodiment of my invention.
Figure 16:
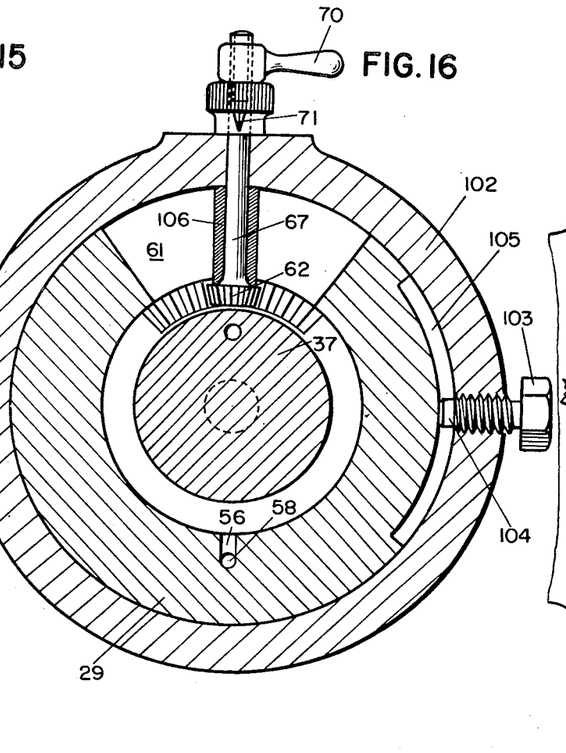
Fig. 16 shows a cross sectional view along line 16—16 in Fig. 15
Figure 17:
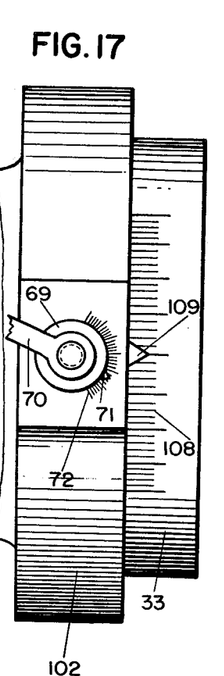
Fig. 17 shows a partial top view thereof.

This retardation, however, may be avoided by certain additional means shown in Figs. 6a and 7, and in Figs. 15, 16, and 17, respectively, which means will permit to adjust the beginning of the injection in any manner that may be required.

According to Figs. 6a and 7 the outer end of the driving shaft 38 for the distributor disc 37 is provided with a right-handed high pitched thread 75 and the opposing end of the engine driven shaft 77 is provided with an equivalent left-handed high pitched thread 76. These two threaded ends of the shafts 38 and 77 are connected by the threaded coupling box 78. A shifting ring 79 is rotatably mounted in a groove of said box 78 and is provided with pegs 80 which are engaged by the slotted ends of a forked lever 81 having an extension 82. Said lever 81 with its extension 82 is swingably mounted upon the pivot 83 whose support is attached for example to the crank case 84. The lever extension 82 is provided with a pointer 87 which cooperates with a graduation upon a stationary segment 85 to which said lever extension 82 may be secured in any desired position by the clamping screw 86.

If, for example, the lever extension 82 is shifted to the right then the coupling box 78 is moved to the left and is turned by the left handed thread 76 of the primary driving shaft 77. This turning of said box 78 effects a rotation of the shaft 38 and of the distributor disc 37 connected therewith in opposite direction to their direction of rotation indicated by the arrow Z in Fig. 3 and in consequence thereof the apportioning ducts 47 arranged in the distributor disc 37 will be retarded in their cooperation with the slots 65 in the adjusting discs 60. It is evident that this cooperation between said ducts 47 and said slots 65 and therefor the start of the injection will be advanced if the lever extension 82 is shifted to the left as then all movements described above will occur in opposite direction.

Figure 10:
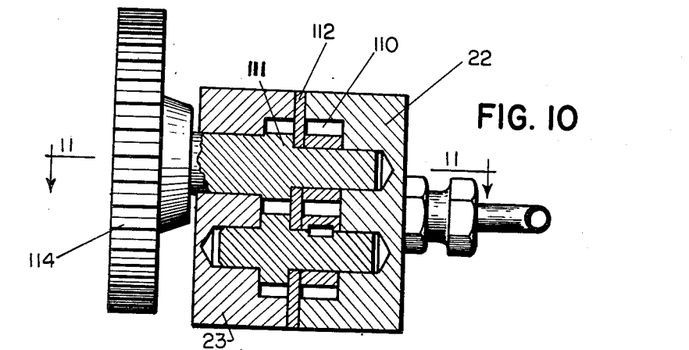
Figs. 10 and 11 show longitudinal sectional views of a fuel pump unit along lines 10—10 and 11—11, respectively, in said figures.

A fuel pump unit which may be used in connection with my fuel injection and distributing apparatus is illustrated in Figs. 10 and 11. The said unit is composed of a suction pump 22 and a pressure pump 23 both being of the rotary type, more particularly of the gear type with gears 110 and 111, respectively. The pump sections 22 and 23 are separated by the division plate 112. The suction pump 22 draws the fuel through the suction pipe 21 over a customary fuel filter from the fuel tank or tanks and delivers the fuel through the connecting pipe 113 into the high pressure pump 23 which feeds the fuel into the fuel pressure chamber 27 in the accumulator 28 of my new apparatus. The pump unit 22, 23 is actuated by the spur gear 114 which may be driven directly by the engine shaft or in any other suitable manner.

Whereas in the embodiments shown in Figs. 1 and 6 the distributor disc 37 is integral with the shaft 38 said distributor disc 37 may be flexibly connected to said shaft 38 as illustrated in Figs. 12, 13 and 14. The shaft 38 is provided with a spherical collar 90 which is fitted into the central opening 91 of the distributor disc 37 and which contains a groove 92 adapted to receive a joint-tongue or feather 93 engaging a groove 94 in the disc 37. In order to insure a completely flexible connection between the disc 37 and the shaft 38 the flanks 95 of said joint-tongue 93 are slightly convex shaped as illustrated in Fig. 14 and the upper surface 96 thereof is cylindrical about an axis passing through the center of the spherical collar 90.

The draining channel 49 which in the embodiments shown in Figs. 1 and 6 is connected to the axial channel 51 in the shaft 38 is in the embodiment illustrated in Figs. 12, 13 and 14 connected to an outwardly running radial outlet channel 97 leading into the enlarged collecting groove 98 which is connected with the return pipe 59 carrying the drained fuel into the storage tank or tanks.

Figs. 15, 16 and 17 already shortly mentioned above show a modification of the embodiment illustrated in Fig. 6, with means to adjust, that is to advance or to retard the start of the fuel injection into the engine. The casing 29 is provided with a cylindrical shoulder 101 which supports the rotatable collar 102. This collar is adjustably fixed to the casing 29 by the adjusting screw 103 which with its point 104 engages a groove 105 upon said casing 29. The shaft 67 of the bevel gear 62 is rotatably mounted in said collar 102 and is held in relative fixed relation thereto by the sleeve 106. Said sleeve 106 moves in the slot 107 of the casing 29 when the collar 102 is turned for adjustment. The partial top view illustrated in Fig. 17 shows the graduation 108 on the cover 33 and the indicator 109 attached to the collar 102.

It will be well understood that the collar 102 when turned in one or the other direction will effect a turning of the adjusting discs 60 in the same direction and by the same angle. Thus the start of the fuel injection may be advanced or retarded.

Although specific embodiments of my invention have been shown and described to illustrate the application of the principles of my invention, it will be understood that the same may be otherwise embodied without departing from such principles.

What I claim as my invention is:

1. In a fuel injection and distributing apparatus for multi-cylinder internal combustion engines the combination comprising a stationary head plate; a plurality of equidistantly and concentrically arranged passages therein; each passage adapted for connection with a fuel injection line leading into one engine cylinder; a stationary high pressure fuel accumulator arranged coaxially with said head plate; a plurality of equidistantly and concentrically arranged outlet ducts in said accumulator, each of said outlet ducts being axially in line with one of said passages in said head plate; a throttle disc and a rotating distributor disc in close assembly between and with said accumulator and said head plate; said throttle disc being next to said accumulator and said distributor disc next to said head plate; slide faces upon the contacting surfaces of each of said discs, the said head plate and the said accumulator, respectively; a plurality of slots in said throttle disc each registering with one of said outlet ducts in said accumulator; the throttle disc being rotatably adjustable relative to said accumulator to vary the degree of registration between said slots and said outlet ducts and means to effect such adjustment of said throttle disc; an apportioning duct in the rotating control disc arranged to successively register with and to connect each passage in said head plate and each slot in the throttle disc; means to rotate said distributor disc in timed relation to the engine, means to supply said accumulator with fuel under pressure at least equal to the required injection pressure; and means to maintain the fuel pressure in said accumulator at least approximately constant.

2. In a fuel injection and distributing apparatus for multi-cylinder internal combustion engines the combination comprising a stationary head plate; a plurality of equidistantly and concentrically arranged passages therein; each passage adapted for connection with a fuel injection line leading into one engine cylinder; a check valve in each of said passages; a stationary high pressure fuel accumulator arranged coaxially with said head plate; a plurality of equidistantly and concentrically arranged outlet ducts in said accumulator; each of said outlet ducts being axially in line with one of said passages in said head plate; a throttle disc and a rotating distributor disc in close assembly between and with said accumulator and said head plate; said throttle disc being next to said accumulator and said distributor disc next to said head plate; slide faces upon the contacting surfaces of each of said discs, the said head plate and the said accumulator, respectively; a plurality of slots in said throttle disc each registering with one of said outlet ducts in said accumulator; the throttle disc being rotatably adjustable relative to said accumulator to vary the degree of registration between said slots and said outlet ducts and means to effect such adjustment; an apportioning connecting duct in the rotating control disc arranged to successively register with and to connect each passage in said head plate and each slot in the throttle disc; a driving shaft for said distributor disc to rotate the same in timed relation to the engine; means to supply said accumulator with fuel under pressure at least equal to the required injection pressure; and means to maintain the fuel pressure in said accumulator at least approximately constant.

3. In a fuel injection and distributing apparatus for multi-cylinder internal combustion engines the combination comprising a casing having a cylindrical bore; a head plate covering said bore on one side; a plurality of equidistantly and concentrically arranged passages in said head plate; each passage adapted for connection with a fuel injection line leading into one engine cylinder; a check valve in each of said passages; a stationary cylindrical high pressure accumulator fitted into said cylindrical bore of the casing; a pressure chamber in said accumulator to hold the fuel under pressure; a plurality of equidistantly and concentrically arranged outlet ducts in the wall of the accumulator facing the head plate; each of said outlet ducts being axially in line with one of said passages in said head plate; between said accumulator and said head disc a rotatingly adjustable throttle disc next to the latter and a rotating distributor disc next to the former; each of said discs, the head plate and the accumulator provided with contacting slide faces for mutual cooperation; means to hold these parts in close assembly within said casing; a plurality of slots in said throttle disc each registering with one of said outlet ducts in said accumulator; the throttle disc being rotatably adjustable relative to said accumulator to vary the degree of registration between said slots and said outlet ducts, and means to effect such adjustment; a connecting apportioning duct in the rotating distributor disc arranged to successively register with and to connect each passage in said head plate and each slot in the throttle disc, means to rotate said distributor disc in timed relation to the engine; means to supply said accumulator with fuel under pressure at least equal to the required injection pressure and means to maintain the fuel pressure in said accumulator at least approximately constant.

4. In a fuel injection and distributing apparatus for multi-cylinder internal combustion engines the combination comprising a casing having a cylindrical bore; a head plate covering said bore on one side; a plurality of equidistantly and concentrically arranged passages in said head plate; each passage adapted for connection with a fuel injection line leading into one engine cylinder; a check valve in each of said passages; a stationary cylindrical high pressure accumulator fitted into said cylindrical bore of the casing; an annular pressure chamber in said accumulator to hold the fuel under pressure; a plurality of equidistantly and concentrically arranged outlet ducts in the wall of the accumulator facing the head plate; each of said outlet ducts being axially in line with one of said passages in said head plate; between said accumulator and said head disc a rotatingly adjustable throttle disc next to the latter and a rotating distributor disc next to the former; each of said discs, the head plate and the accumulator provided with contacting slide faces for mutual cooperation and means to hold these parts in close assembly within said casing; a plurality of slots in said throttle disc each registering with one of said outlet ducts in said accumulator, the throttle disc being rotatably adjustable relative to said accumulator to vary the degree of registration between said slots and said outlet ducts and means to effect such adjustment; a connecting apportioning duct in the rotating distributor disc arranged to successively register with and to connect each passage in said head plate and each slot in the throttle disc; a driving shaft for said distributor disc rotating in timed relation to the engine; a central opening in said throttle disc and in said accumulator for said driving shaft passing therethrough; means to supply said accumulator with fuel under pressure at least equal to the required injection pressure and means to maintain the fuel pressure in said accumulator at least approximately constant.

5. In the fuel injection and distributing apparatus according to claim 1 at least one auxiliary duct in the distributor disc, and duct preceding the connecting duct in the direction of rotation of the distributor disc and successively registering with and connecting each passage in the head plate and each slot in the throttle disc to effect a pre-injection of fuel.

6. In a fuel injection and distributing apparatus according to claim 4, a draining channel in the distributor disc following the connecting duct in the direction of rotation of said disc, an axial channel in the driving shaft for said disc, a connecting channel between said draining channel and said axial channel, an outlet channel connected to the latter, a stationary collecting ring surrounding said outlet channel and a return piping for the drained off fuel attached to said collecting ring.

7. In a fuel injection and distributing apparatus according to claim 1 a draining channel in the distributor disc following the connecting duct in the direction of rotation of said disc and successively registering with the passages in the head plate, an essentially radial outlet channel connected to said draining channel to carry drained off oil to the periphery of the distributor disc, an annular collecting channel in the cylindrical bore of the casing cooperating with said radial outlet channel, and a return piping for the drained off oil attached thereto.

8. In a fuel injection and distributing apparatus according to claim 3, means for adjusting the position of the throttle disc relative to the accumulator comprising a toothing on the circumference of said disc and a rack cooperating therewith and slidably mounted in the casing.

9. In a fuel injection and distributing apparatus according to claim 3, means to collect oil escaping between the sliding surfaces of the head plate, the distributor disc, the throttle disc and the accumulator, respectively, said means comprising a plurality of circular grooves in the cylindrical boring of the casing, each groove surrounding the outer edges of said sliding surfaces, a collecting channel connecting said grooves and a return piping connected to said connecting channel.

10. In a fuel injection and distributing apparatus for multi-cylinder internal combustion engines according to claim 1, means to regulate the period of injection, said means comprising one rotatably mounted control disc interposed on each side of the distribution disc between the same and the head plate and throttle disc, respectively; means to turn said control disc simultaneously in opposite direction; a plurality of longitudinal slots in each of said control discs; said slots being arcshaped concentrically with the rotational axis of the distributor disc; each slot registering with one opening with the apportioning connecting ducts in the distribution disc and with its other opening with the outlet ducts in the accumulator and the passages in the head plate, respectively, the longitudinal extension of said slot opening facing said outlet ducts and said passages, respectively, corresponding to the maximum variations of the injection start angle of the engine and being greater than that of the slot openings facing the distributor disc and corresponding to the largest injection period angle.

11. In a fuel injection and distributing apparatus for multi-cylinder internal combustion engines according to claim 3, means to regulate the period of injection, said means comprising one rotatably mounted control disc interposed on each side of the distribution disc between the same and the head plate and throttle disc, respectively; a plurality of longitudinal slots in each of said control discs; said slots being arcshaped concentrically with the rotational axis of the distributor disc; each slot registering with one opening with the apportioning connecting ducts in the distribution disc and with its other opening with the outlet ducts in the accumulator and with the passages in the head plate, respectively, the longitudinal extension of said slot openings facing said outlet ducts and said passages, respectively, being greater than that of the slot openings facing the distributor disc and corresponding to the largest injection period angle; a bevel gear arranged between said control discs near their circumferences; a toothing on each control disc adapted to cooperate with said bevel gear; a driving shaft for said bevel gear rotatably mounted in said casing; actuating means for said shaft and locking means for the same.

12. In a fuel injection and distributing apparatus for multi-cylinder internal combustion engines according to claim 3, means to regulate the start and the period of injection, said means comprising one rotatably mounted control disc interposed on each side of the distribution disc between the same and the head plate and throttle disc, respectively; a plurality of longitudinal slots in each of said control discs; said slots being arcshaped concentrically with the rotational axis of the distributor disc; each slot registering with one opening with the apportioning connecting ducts in the distribution disc and with its other opening with the outlet ducts in the accumulator and the passages in the head plate, respectively, the longitudinal extension of said slot openings facing said outlet ducts and said passages, respectively, being greater than that of the slot openings facing the distributor disc and corresponding to the largest injection period angle; a bevel gear arranged beneath said control discs near their circumference; a driving shaft for said bevel gear; a rotatably adjustable collar on the casing; said collar rotatably supporting said shaft; a slot in the casing enclosing said shaft and permitting the same to follow the rotational displacement of said collar; actuating means for said shaft and locking means for the same.

13. In a fuel injection and distributing apparatus for multi-cylinder internal combustion engines according to claim 4, means to regulate the start of injection, said means comprising a primary driving shaft coaxial with the driving shaft for the distributor disc; high pitched threads on the opposing ends of said shafts, one being left handed and the other right handed; an internally threaded coupling box slid over the threaded ends of said shafts, and means to displace said coupling box in axial direction relative to said shafts.

HEINRICH LANG.

References Cited in the file of this patent

UNITED STATES PATENTS

| Number | Name | Date |
| --- | --- | --- |
| 1,443,777 | Woodcock | Jan. 30, 1923 |
| 1,784,170 | Benes | Dec. 9, 1930 |
| 2,123,815 | Tweddell | July 12, 1938 |
| 2,223,590 | Alden | Dec. 3, 1940 |
| 2,291,939 | Amery | Aug. 4, 1942 |
| 2,363,576 | Devorak | Nov. 28, 1944 |
| 2,483,949 | Washington | Oct. 4, 1949 |